Patented July 29, 1930

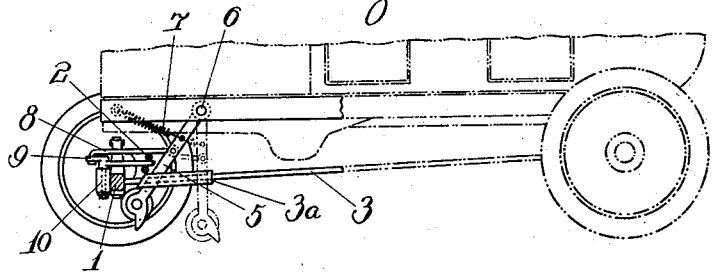
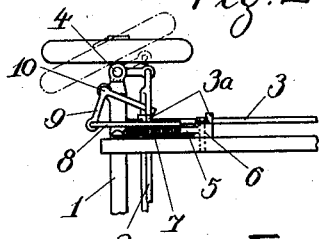
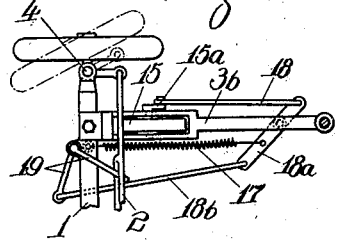
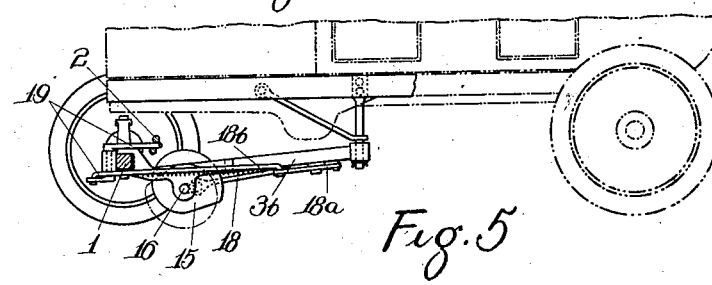
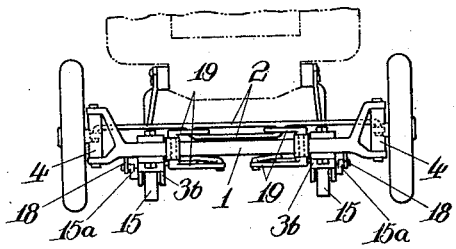

1,771,825

UNITED STATES PATENT OFFICE

TSUNETARO TAKEHARA, OF OKAYAMA, JAPAN

AUTOMATIC STEERING APPARATUS OF AUTOMOBILES

Application filed February 4, 1929, Serial No. 337,427, and in Japan July 4, 1927.

This invention relates to improvements in a steering apparatus of automobiles. It consists of an extended member provided at the inside of each front wheel of an automobile, said member being so connected with a steering apparatus that when one of the wheels of the automobile gets accidentally in a rut such as the outside of a road along which the car is running, the weight of the car presses the extended member and the pressure controls the steering apparatus so as to direct the front wheels in such a direction, that the car automatically will return to the road out of the rut.

The accompanying drawing shows two examples of the apparatus according to this invention, in which Fig. 1 is a side view of the apparatus, the inner side of a front wheel appearing as seen from the centre of the car. Fig. 2 is a plan view of the apparatus, the car body being removed. Figs. 3 and 4 are the same views as Figs. 1 and 2, respectively, of a modified form of the apparatus, and Fig. 5 is a front elevation of the same. The same reference character indicates the same or similar part of the apparatus.

This apparatus can be attached to an ordinary automobile. In the drawing, 1 is the front beam of the car frame and on each side of the beam is pivotally provided a front wheel as usual. A bar 2 is a member of an ordinary steering apparatus and connects the axles of the front wheels, and a driver steers the car by a steering handle which is connected with this bar.

3 is a bar attached to the car frame, and a bar or plate $3^a$ is firmly attached thereto forming a slot between them, in which slot a lever 5 is guided. The lever 5 is pivoted on the car frame at its top end 6, and is provided with a small wheel and a pointed projection at its lower end. A link 8 and a bell-crank 9, which is pivoted at 10 on the car frame and pivotally connected with the link 8 at one end, connect the lever 5 and the steering bar 2, the free end of the bell-crank being inserted in a slot of the bar 2 so that a motion of the bar does not affect the bell-crank as long as the motion is not large. A spring 7 always pulls up the lever 5 to such a position that the lower end of the lever is kept at a few inches higher than the tread portion of the wheel.

When the right-hand front wheel, for example, of a car which is provided with the apparatus as shown in Figs. 1 and 2 accidentally gets off the road and drops into a rut, the lower end of the lever 5 touches the surface of the road, and the weight of the car presses the lever on the ground. The pointed end of the lever sticks in the ground. While the car is advancing due to its inertia, the lever pulls the link 8 and the bell-crank 9, which moves the steering bar 2 so as to direct both front wheels as shown in the dotted lines. Since another front wheel which has now been directed in the same direction with the lower wheel is still on the road, movement of the wheel will bring the car to the left and bring the lower wheel back on the road. As soon as the lower wheel gets on the road, the lever 5 is pulled up by the spring and resumes its normal position, because the lever is too short to touch the ground when both wheels are on the same plane.

In the modification shown in Figs. 3, 4 and 5, the apparatus consists of a cam 15 rotatively mounted on a bracket $3^b$ which is firmly fixed to the car frame by means of a bolt and a stay rod. On the axis of the cam 15 is provided a crank $15^a$, which is connected with the steering bar 2 through the mediation of a series of links 18, $18^a$, $18^b$, and 19. A spring 17 which is connected between the link $18^a$ and the car-frame always pulls the link so as to pull the crank $15^a$ rearward which corresponds to the position of the cam 15 where the shortest radius faces the ground. The arrangement of the links, the cam and the spring is clearly shown in Fig. 4.

When the front wheel gets off the road or into a rut, the cam touches the surface of the ground and is turned owing to the advance of the car. While the cam turns half a revolution, the bell-crank is pulled so that the front wheels are directed in such a direction that the car will be directed back on the road or out of the rut. As soon as both front wheels take a normal position on the ground, the cam is turned by the spring 17, and resumes the position as shown in Fig. 3.

What I claim is:—

1. An automatic steering apparatus for automobiles comprising a car frame, a downwardly extending member provided at the inside of each front wheel, a series of links connecting the extending member and a steering bar which is operated by a driver, and means to automatically operate the steering bar so as to direct the front wheels to a proper direction when one of the front wheels gets off the road or into a rut so that the extended member is pressed by the forward motion of the car.

2. An automatic steering apparatus for automobiles comprising a car frame, a lever provided at the inside of each front wheel and pivotally connected with the car frame at its top end, a spring fastened at one end to the lever and at the other end to the car frame so as to always pull up the lever to such a position that the lower end of same is a little higher than the treading portion of the front wheels, and a series of links connecting the lever and a steering bar in such a relation that when one of the front wheels gets off the road or into a rut and the forward motion of the advancing car rocks the lever, the rocking motion of the lever operates the steering bar so as to direct the front wheels onto the road.

3. An automatic steering apparatus for automobiles comprising a car frame, a cam disc provided at the inside of each front wheel and rotatively mounted on a bracket, a crank shaft of the cam disc, a series of links connecting the crank shaft and a steering bar, a spring connecting one of the links and the car frame so as to face the shortest radius of the cam disc to the ground, and means to rotate the cam disc when one of the front wheels gets off the road or into a rut so that the forward motion of the advancing car presses the cam disc, so as to control the steering bar in order to direct the front wheels onto the road.

In testimony whereof I have signed my name to this specification.

TSUNETARO TAKEHARA. [L. S.]